United States Patent
Sadasivam et al.

(10) Patent No.: US 11,803,386 B2
(45) Date of Patent: Oct. 31, 2023

(54) NEURON CACHE-BASED HARDWARE BRANCH PREDICTION

(71) Applicant: INTERNATIONAL BUSINESS MACHINES CORPORATION, Armonk, NY (US)

(72) Inventors: Satish Kumar Sadasivam, Erode (IN); Shruti Saxena, Kanpur (IN); Puneeth A. H. Bhat, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 86 days.

(21) Appl. No.: 17/476,690

(22) Filed: Sep. 16, 2021

(65) Prior Publication Data
US 2023/0078582 A1 Mar. 16, 2023

(51) Int. Cl.
*G06F 9/38* (2018.01)
*G06N 3/063* (2023.01)

(52) U.S. Cl.
CPC .......... *G06F 9/3806* (2013.01); *G06F 9/3848* (2013.01); *G06N 3/063* (2013.01)

(58) Field of Classification Search
CPC ...... G06F 9/3806; G06F 9/3848; G06N 3/063
See application file for complete search history.

(56) References Cited

U.S. PATENT DOCUMENTS

| | | | |
|---|---|---|---|
| 7,673,122 B1* | 3/2010 | Song | G06F 9/3848 712/240 |
| 9,442,726 B1 | 9/2016 | Bonanno et al. | |
| 2005/0240897 A1* | 10/2005 | Kailas | G06F 9/45504 712/E9.055 |
| 2008/0005542 A1* | 1/2008 | Gschwind | G06F 9/3844 712/239 |
| 2008/0256347 A1* | 10/2008 | Eickemeyer | G06F 9/322 712/240 |
| 2018/0285107 A1 | 10/2018 | Sadasivam et al. | |
| 2018/0314524 A1 | 11/2018 | Keskin et al. | |
| 2019/0004802 A1 | 1/2019 | Tarsa et al. | |
| 2019/0213008 A1* | 7/2019 | Bhat | G06F 9/3806 |
| 2022/0091850 A1* | 3/2022 | Ren | G06F 9/3842 |

FOREIGN PATENT DOCUMENTS

| | | |
|---|---|---|
| WO | WO2020146724 A1 | 7/2020 |
| WO | WO2020247829 A1 | 12/2020 |

OTHER PUBLICATIONS

IBM, "z/Architecture—Principles of Operation," IBM Publication No. SA22-7832-12, Thirteenth Edition, Sep. 2019, pp. 1-2000.
(Continued)

*Primary Examiner* — Shawn Doman
(74) *Attorney, Agent, or Firm* — Teddi Maranzano, Esq.; Blanche E. Schiller, Esq.; Heslin Rothenberg Farley & Mesiti P.C.

(57) ABSTRACT

A branch prediction system includes a neuron cache and logic coupled to the neuron cache. The neuron cache includes one or more weights of a neural network model trained for one or more selected code sections, and the logic is to be used with the neuron cache to predict a target address for a branch instruction of the one or more selected code sections.

20 Claims, 12 Drawing Sheets

(56) References Cited

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.
Vitan, Lucian N., "Neural Branch Prediction: From The First Ideas, To Implementations In Advanced Microprocessors And Medical Applications," Proceedings of the Romanian Academy, Series, A, vol. 20, No. 2, Jun. 2019, pp. 1-8.
Jiménez, Daniel J., "Fast Path-Based Neural Branch Prediction," Proceedings of the 36$^{th}$ International Symposium on Microarchitectures, Dec. 2003, pp. 1-10.

\* cited by examiner

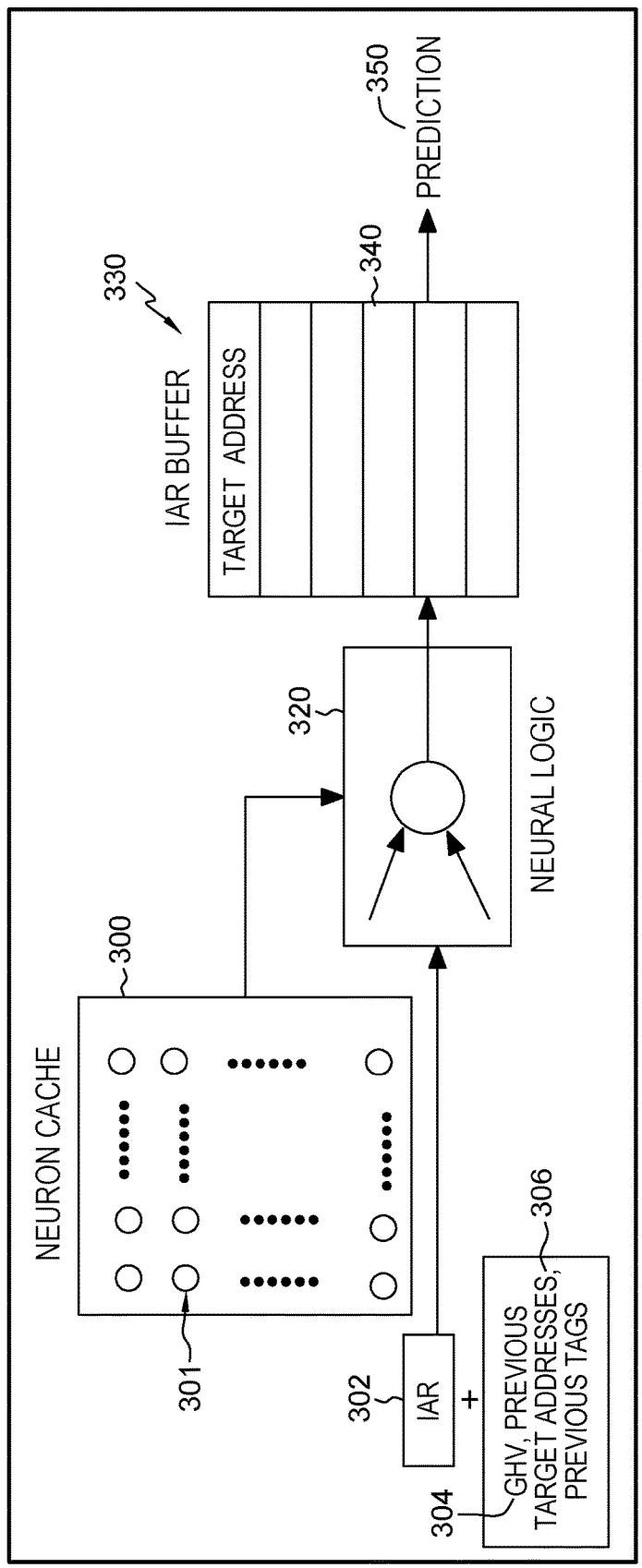

NEURON CACHE-BASED HARDWARE BRANCH PREDICTION

BACKGROUND

One or more aspects relate, in general, to facilitating processing within a computing environment, and in particular, to improving such processing.

Processing within a computing environment includes executing instructions that perform various tasks. By increasing the efficiency at which the instructions are executed, performance of the computing environment is improved. To improve efficiency in certain computing environments, including those using pipelined computer architectures, branch prediction is employed in which a target address of a branch instruction is predicted prior to that branch being executed. In such an architecture, an instruction fetch continues with the predicted target address of the branch. Then, if it is determined that the prediction is incorrect, the incorrectly predicted branch and associated speculatively executed instructions are discarded such that the pipeline can start over with the correct path.

While there are a number of target address prediction techniques that are available, further efficiencies continue to be sought.

SUMMARY

Shortcomings of the prior art are overcome, and additional advantages are provided through the provision of a branch prediction system. The branch prediction system includes a neuron cache, and the neuron cache includes one or more weights of a neural network model trained for one or more selected code sections. Further, the branch prediction system includes logic coupled to the neuron cache to be used with the neuron cache to predict a target address for a branch instruction of the one or more selected code sections.

Computer-implemented methods, computer systems and computer program products relating to one or more aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 3 depicts one example of a hardware neuron cache used in accordance with one or more aspects of the present invention;

FIG. 4 depicts one example of an instruction address register history structure used in accordance with one or more aspects of the present invention;

DETAILED DESCRIPTION

In accordance with one or more aspects of the present invention, a capability is provided to facilitate processing within a computing environment. As an example, a hardware-based indirect branch prediction facility is provided that uses deep neural network principles. The facility includes, for example, a hardware branch predictor, which is application centric in that the branch predictor is used by select applications (and, e.g., by select code of those applications) to efficiently predict target addresses for branches, such as difficult-to-predict branches. In one example, the select applications register with a control program, such as an operating system, to be able to use the branch predictor.

The hardware branch predictor uses, for instance, a hardware structure, referred to as a neuron cache, that holds the weights of a deep neural network model, and neural prediction logic to predict a next target address for a selected instruction address register. The model may be trained for any target application or for any portion of a target application and can be loaded into the neuron cache during runtime to be used for prediction.

One embodiment of a computing environment to incorporate and use one or more aspects of the present invention is described with reference to FIG. 1A. As an example, the computing environment is based on the z/Architecture® instruction set architecture, offered by International Business Machines Corporation, Armonk, New York. One embodiment of the z/Architecture instruction set architecture is described in a publication entitled, "z/Architecture Principles of Operation," IBM Publication No. SA22-7832-12, Thirteenth Edition, September 2019, which is hereby incorporated herein by reference in its entirety. The z/Architecture instruction set architecture, however, is only one example architecture; other architectures and/or other types of computing environments of International Business Machines Corporation and/or of other entities may include and/or use one or more aspects of the present invention. As other examples, the computing environment may be based on a Power® instruction set architecture offered by International Business Machines Corporation, the Intel® x86 architectures offered by Intel Corporation and/or other architectures of International Business Machines Corporation and/or of other entities. z/Architecture, Power and IBM are trademarks or registered trademarks of International Business Machines Corporation in at least one jurisdiction. Intel is a trademark or registered trademark of Intel Corporation or its subsidiaries in the United States and other countries.

Figure 1A:
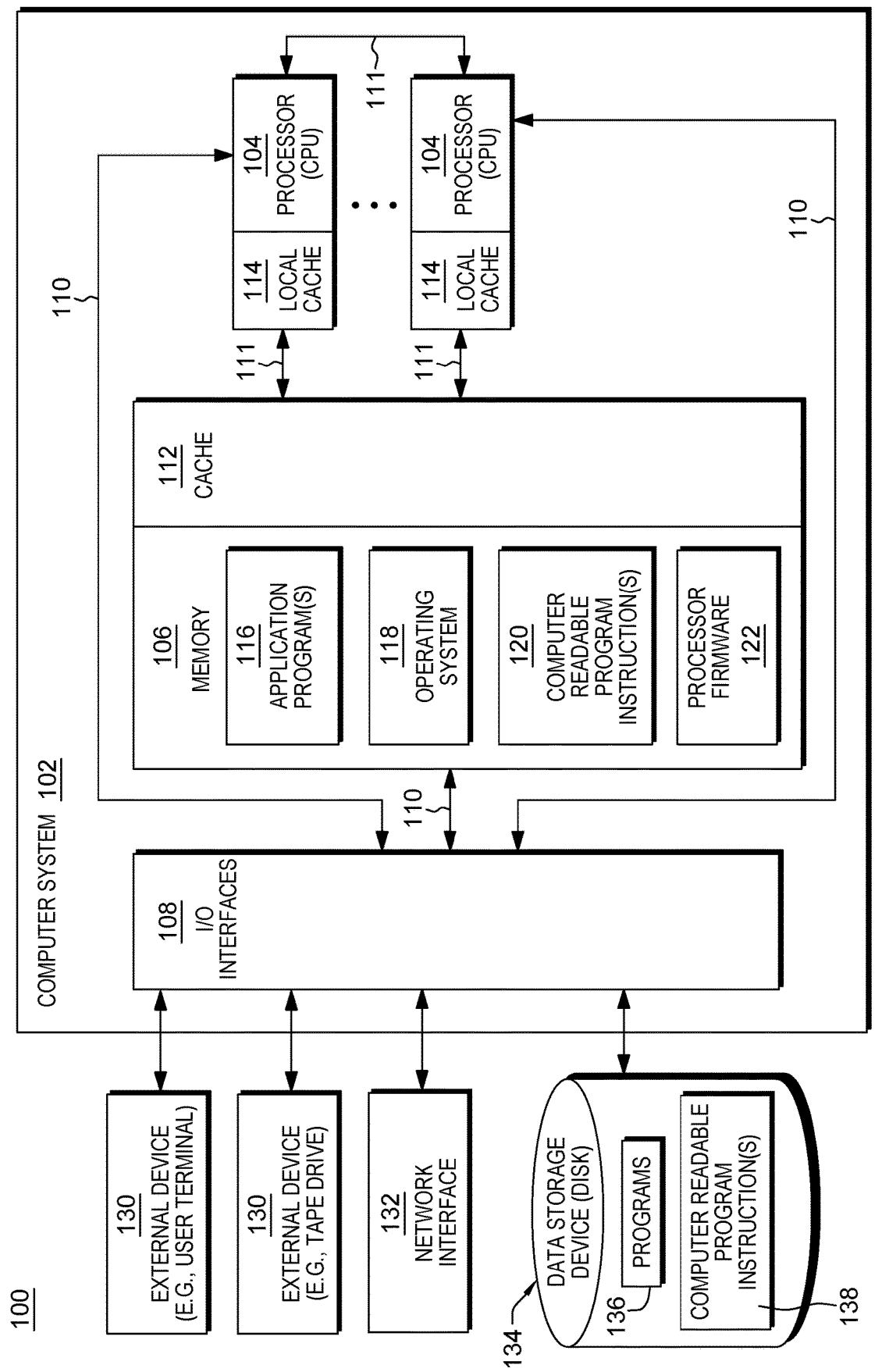
FIG. 1A depicts one example of a computing environment to incorporate and use one or more aspects of the present invention.

Referring to FIG. 1A, a computing environment 100 includes, for instance, a computer system 102 shown, e.g., in the form of a general-purpose computing device. Computer system 102 may include, but is not limited to, one or more general-purpose processors or processing units 104 (e.g., central processing units (CPUs)), a memory 106 (a.k.a., system memory, main memory, main storage, central storage or storage, as examples), and one or more input/output (I/O) interfaces 108, coupled to one another via one or more buses and/or other connections. For instance, processors 104 and memory 106 are coupled to I/O interfaces 108 via one or more buses 110, and processors 104 are coupled to one another via one or more buses 111.

Bus 111 is, for instance, a memory or cache coherence bus, and bus 110 represents, e.g., one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 112, such as a shared cache, which may be coupled to local caches 114 of processors 104 via, e.g., one or more buses 111. Further, memory 106 may include one or more programs or applications 116 and at least one operating system 118. An example operating system includes a z/OS® operating system, offered by International Business Machines Corporation, Armonk, New York. z/OS is a trademark or registered trademark of International Business Machines Corporation in at least one jurisdiction. Other operating systems offered by International Business Machines Corporation and/or other entities may also be used. Memory 106 may also include one or more computer readable program instructions 120, which may be configured to carry out functions of embodiments of aspects of the invention.

Moreover, in one or more embodiments, memory 106 includes processor firmware 122. Processor firmware includes, e.g., the microcode or millicode of a processor. It includes, for instance, the hardware-level instructions and/or data structures used in implementation of higher level machine code. In one embodiment, it includes, for instance, proprietary code that is typically delivered as microcode or millicode that includes trusted software, microcode or millicode specific to the underlying hardware and controls operating system access to the system hardware.

Computer system 102 may communicate via, e.g., I/O interfaces 108 with one or more external devices 130, such as a user terminal, a tape drive, a pointing device, a display, and one or more data storage devices 134, etc. A data storage device 134 may store one or more programs 136, one or more computer readable program instructions 138, and/or data, etc. The computer readable program instructions may be configured to carry out functions of embodiments of aspects of the invention.

Computer system 102 may also communicate via, e.g., I/O interfaces 108 with network interface 132, which enables computer system 102 to communicate with one or more networks, such as a local area network (LAN), a general wide area network (WAN), and/or a public network (e.g., the Internet), providing communication with other computing devices or systems.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode or millicode, device drivers, redundant processing units, external disk drive arrays, RAID systems, tape drives, and data archival storage systems, etc.

Computer system 102 may be operational with numerous other general-purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1B:
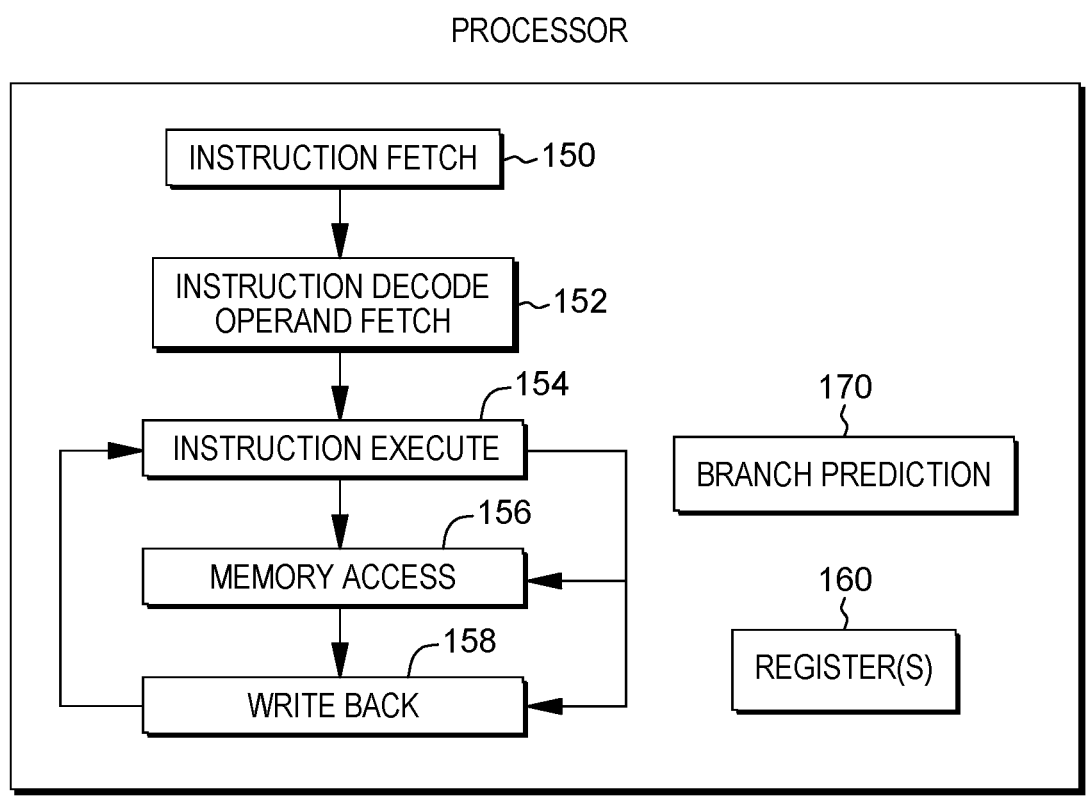
FIG. 1B depicts further details of a processor of FIG. 1A, in accordance with one or more aspects of the present invention.

In one example, a processor (e.g., processor 104) includes a plurality of functional components (or a subset thereof) used to execute instructions. As depicted in FIG. 1B, these functional components include, for instance, an instruction fetch component 150 to fetch instructions to be executed; an instruction decode unit 152 to decode the fetched instructions and to obtain operands of the decoded instructions; one or more instruction execute components 154 to execute the decoded instructions; a memory access component 156 to access memory for instruction execution, if necessary; and a write back component 158 to provide the results of the executed instructions. One or more of the components may access and/or use one or more registers 160 in instruction processing. Further, one or more of the components may, in accordance with one or more aspects of the present invention, include at least a portion of or have access to one or more other components used in performing branch prediction, as described herein. The one or more other components include, for instance, a branch prediction component 170 (and/or one or more other components). Branch prediction component 170 may include and/or have access to one or more structures used in branch prediction, as described herein.

Figure 2:
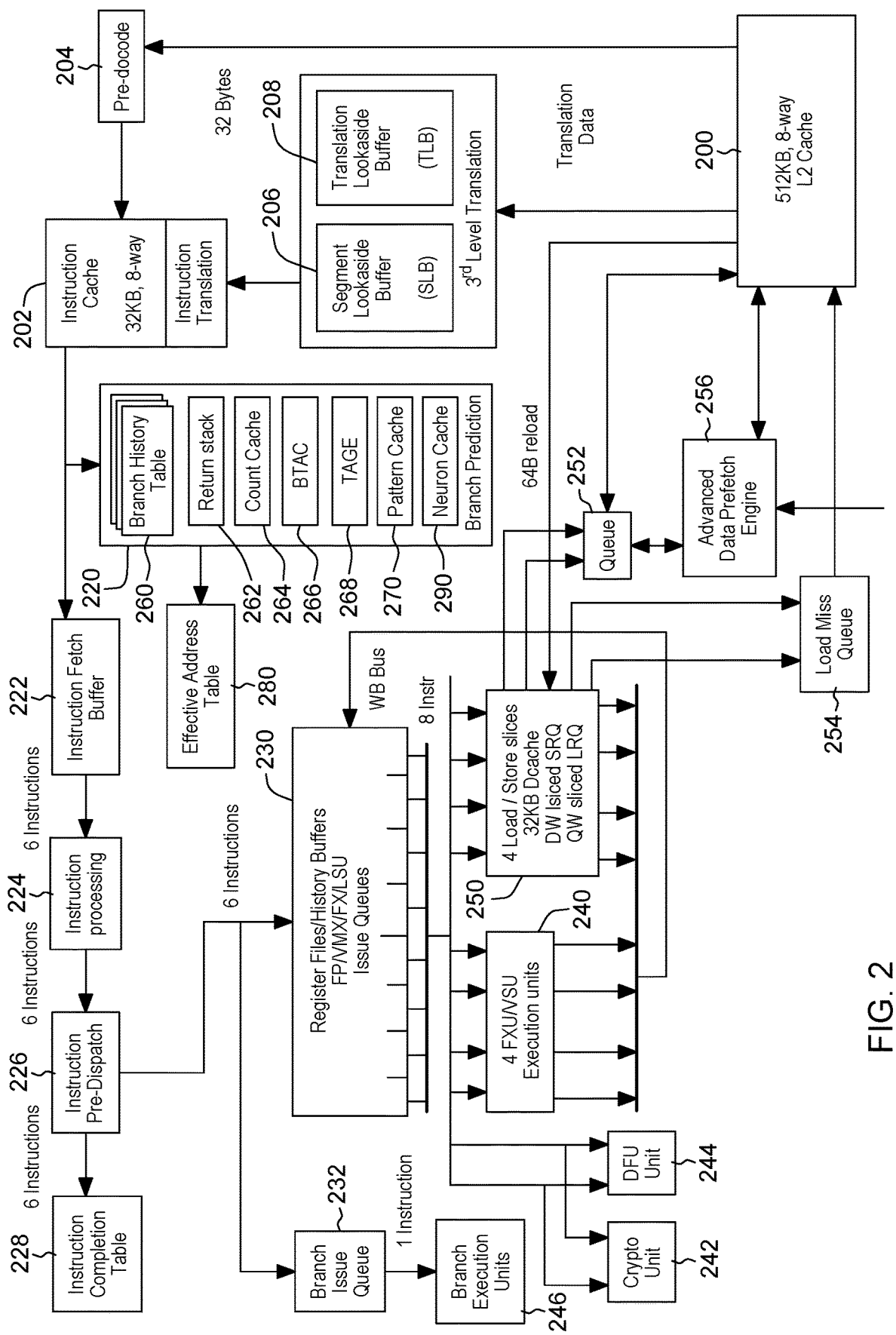
FIG. 2 depicts one example of flow of an instruction through a processor, in accordance with one or more aspects of the present invention.

Further details of the flow of an instruction through a processor (e.g., processor 104) are described with reference to FIG. 2. In one example, instructions are read from one or more caches (e.g., L2 cache 200) into an instruction cache 202, which may be a part of local cache 114 or separate therefrom. When instructions are read from, e.g., cache 200, in one example, pre-decode information 204 useful in processing branches is created for each of the instructions. Further, translation of addresses associated with the fetched instructions is performed resulting in one or more addresses stored in a segment lookaside buffer 206 and/or a translation lookaside buffer 208 used during instruction processing.

Instructions are fetched from instruction cache 202 and placed in an instruction fetch buffer 222. From there, instructions are selected for processing 224 and pre-dispatched 226. Instruction pre-dispatch 226 is coupled to instruction completion table 228 and to one or more issue queues 230, 232. When ready, branch instructions are issued to branch issue queue 232, and other instructions are issued to issue queues 230. Issue queues 230 are coupled to a plurality of execution units, including one or more fixed point units/vector scalar units 240, one or more cryptographic units 242 and one or more decimal floating-point units 244 used in execution of the instructions depending on the instructions. Further, branch issue queue 232 is coupled to one or more branch execution units 246 for execution of branch instructions.

In one embodiment, at least, issue queues 230 and L2 cache 200 are coupled to a data cache 250 that stores data to be used by the instructions. Data cache 250 is further coupled to one or more queues, such as a data store queue 252 and a load miss queue 254. Data store queue 252 is further coupled to L2 cache 200 and an advanced data prefetch engine 256 used to prefetch data into data store queue 252 which may eventually be stored in data cache 250.

Additionally, the instruction flow from, e.g., the memory hierarchy (e.g., the various caches and/or system memory) through one or more issue queues (e.g., issue queues 230, branch issue queue 232) to one or more execution units (e.g., execution units 240, cryptographic unit 242, decimal floating-point unit 244 and branch execution units 246) includes the use of a branch prediction component or unit 220 to efficiently process branch instructions. Branch prediction unit 220 may use various information/components, such as a branch history table 260, a return stack 262, a count cache 264, a branch target address cache (BTAC) 266, a TAgged GEometric length (TAGE) predictor 268, a pattern cache 270, and/or, in accordance with an aspect of the present invention, a neuron cache 290 to predict a branch target address, which may be stored in effective address table 280.

In accordance with one or more aspects of the present invention, neuron cache 290 is selectable for predicting branch addresses. For instance, neuron cache 290 is used in the prediction of selected types of branches, such as difficult-to-predict branches. It is used to improve overall branch prediction in a way that increases the performance of the workload.

One example of using a neuron cache in branch prediction is described with reference to FIG. 3. As depicted, in one example, a neuron cache 300, which includes a plurality of weights 301, is input to neural logic 320, along with one or more of an instruction address register 302, a global history vector (GHV) 304, and previous addresses/tags for one or more instruction address registers 306. Neural logic 320 takes the inputs and based on the instruction address register, weights of the neuron cache and previous history determines one or more indices into an instruction address register buffer 330. In one example, each index has a confidence value associated therewith. Thus, in one example, the index with, e.g., the highest confidence value is selected providing an entry in instruction address register buffer 330 that includes a branch target address 340, which is a predicted target address 350 for the instruction.

In one example, previous target addresses/tags 306 for instruction address register 302 that are input into neural logic 320 are obtained from an instruction address register history structure, an example of which is depicted in FIG. 4. As shown, in one example, an instruction address register history structure (e.g., table) 400 includes one or more entries 402, and each entry 402 includes, for instance, one or more addresses/tags 404 for an instruction address register 406.

Figure 5:
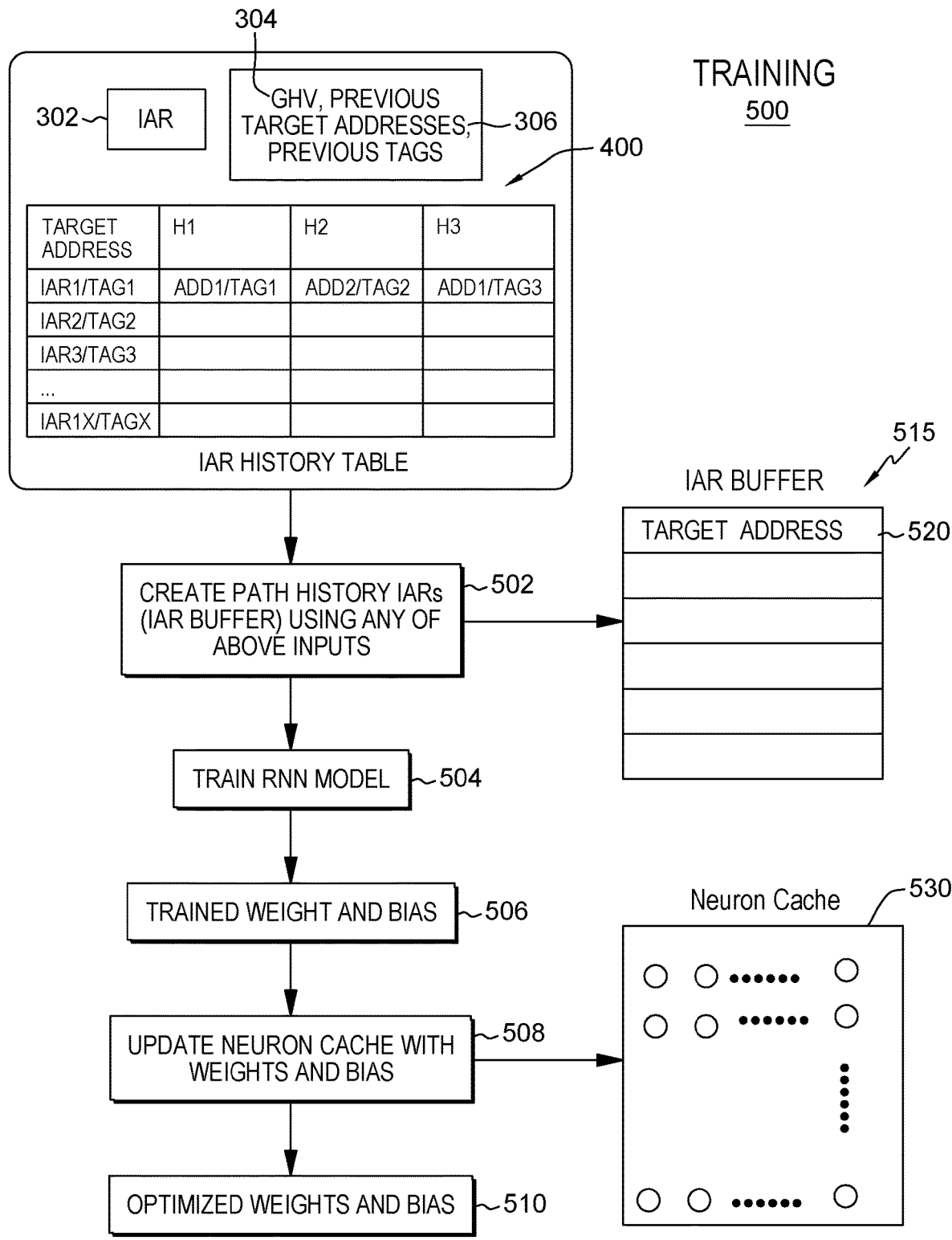
FIG. 5 depicts one example of a training process used to update the neuron cache of FIG. 3, in accordance with one or more aspects of the present invention.

The target addresses for an instruction address register stored in instruction address register buffer 330 are determined during a training process, as described with reference to FIG. 5. Referring to FIG. 5, in one example, a training 500 includes creating a path history for one or more instruction address registers 502. The creating the path history is based on one or more inputs, including, for instance, instruction address register 302, global history vector 304, previous target addresses/tags 306 for one or more instruction address registers and/or instruction address register history structure 400. Based on the inputs, a determination is made of one or more target addresses 520 for the specified instruction address register to be included in an instruction address register buffer 515.

Further, in one example, the created path history is used in training a model, such as a recurrent neural network model 504, which uses feedback loops in its training. Output of the training includes one or more trained weights and biases 506, which are used to update 508 a neuron cache 530. For instance, in one example, neuron cache 530 is used to hold weights of a neural network model. A neural network is a subset of machine learning, which includes deep learning. The neural network uses training data to learn and improve its accuracy. A neural network includes a plurality of node layers, including, for instance, an input layer, one or more hidden layers and an output layer. Each node (also referred to as a neuron) connects to another node and has a weight and bias (also referred to as a threshold) associated therewith. The weights and biases are learnable parameters of the neural network. When the inputs are transmitted between the nodes, the weights are applied to the inputs along with the biases. If an output of a node is above the bias, the node is activated, sending data to the next layer of the neural network. If, however, the node is not above the bias, then no data is passed along to the next layer. Further, in one example, the weights and biases are optimized 510. Additional details regarding using a recurrent neural network and training are described further below.

Figure 6:
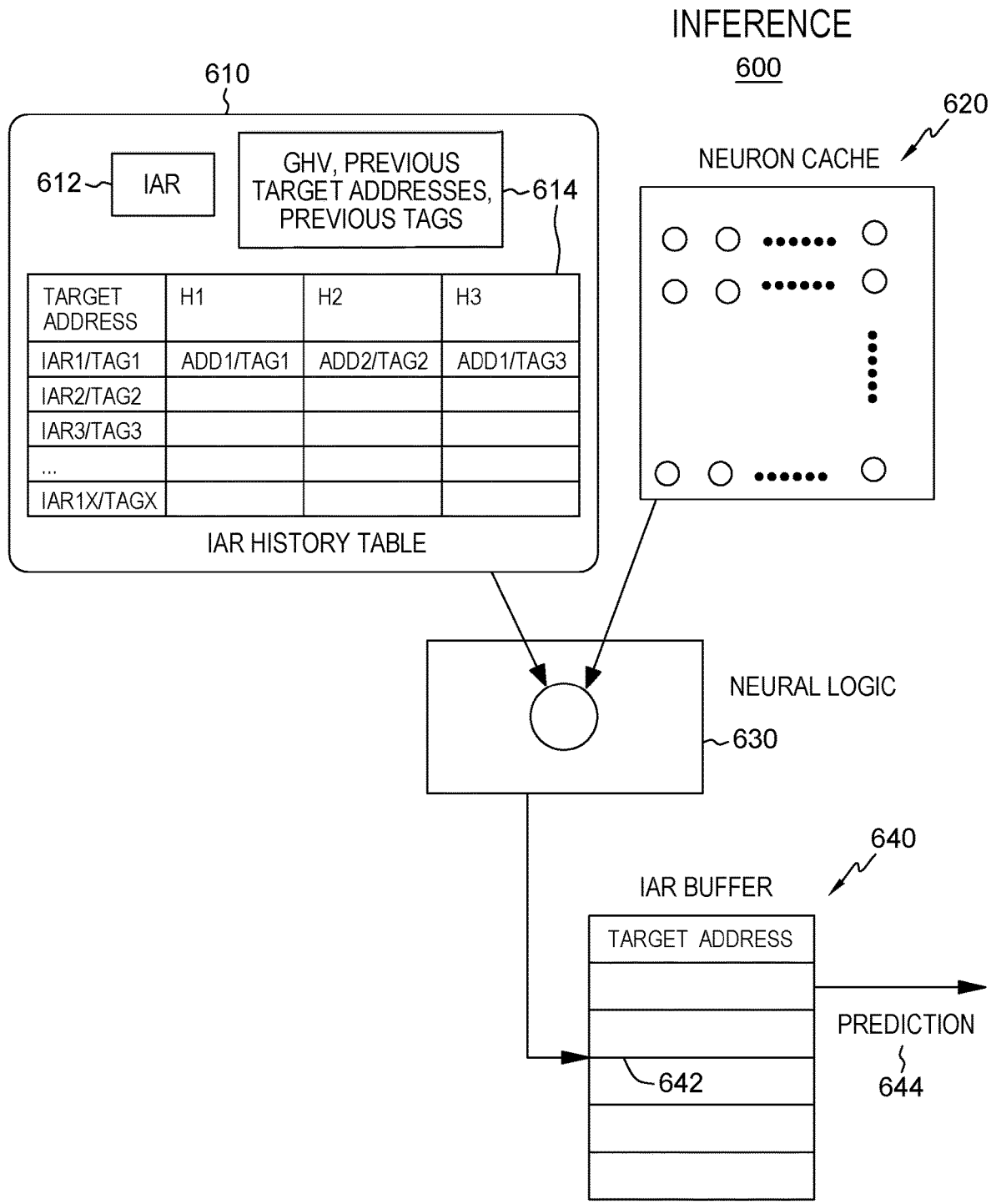
FIG. 6 depicts one example of an inference process to use the neuron cache, in accordance with one or more aspects of the present invention.

Subsequent to performing the training, the trained model is used in inference (i.e., a process of using a trained model to make a prediction), an example of which is described with reference to FIG. 6. Referring to FIG. 6, in one example, an inference 600 includes providing a plurality of inputs 610, 620 to neural logic 630, which outputs a selected entry 642 of an instruction address register buffer 640 producing a predicted target address 644. Inputs 610 include, for instance, an instruction address register 612 and one or more historical inputs 614, and input 620 is a neuron cache.

Neural logic 630 makes a prediction using the inputs of which target address of the instruction address register buffer is to be the target address of the branch instruction. The training may be self-learning, in one embodiment, such that if it is determined later that the prediction is incorrect, this information is provided back to the training, from which it is to learn.

Figure 7:
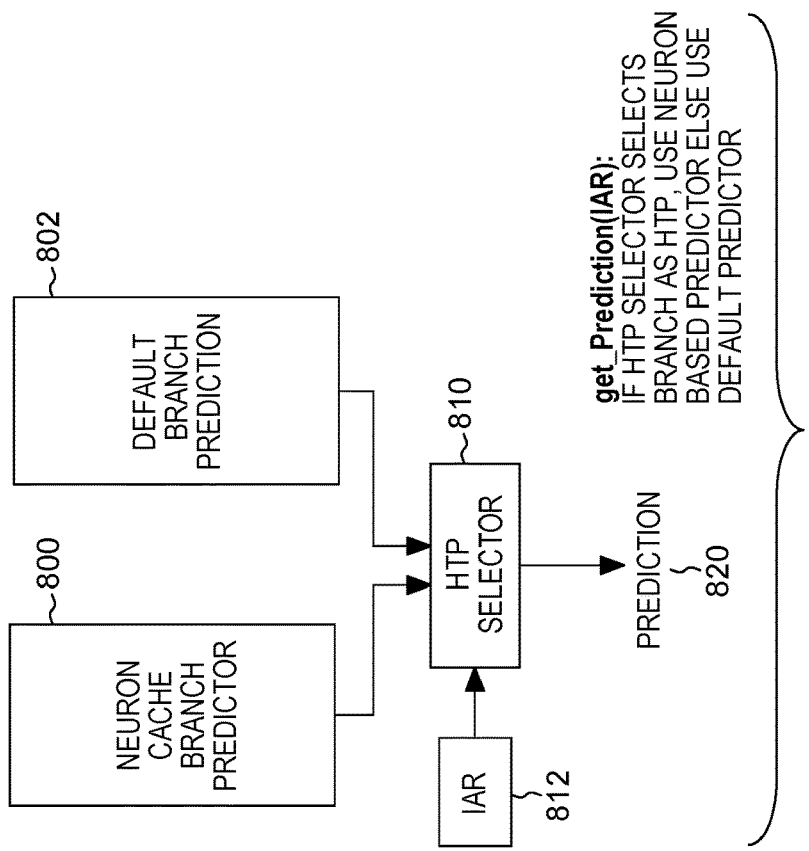
FIG. 7 depicts one example of selecting when to use a hardware neuron cache for prediction, in accordance with one or more aspects of the present invention.

In one or more aspects, the neuron cache is used for selected instructions, such as instructions associated with difficult-to-predict branches, rather than all instructions. In one embodiment, to use the neuron cache for selected instructions a selector is used, as described with reference to FIG. 7. For instance, an indication of a neuron cache branch predictor 700 and an indication of a default branch predictor (e.g., branch history table, TAGE, etc.) 702 are input into a selector 710, and selector 710 selects from a particular instruction address register 712 a predicted target address 720, using either the neuron cache branch predictor or a default branch predictor. As an example, if selector is 1, the neuron cache branch predictor is used; else a default branch predictor is used.

Figure 8:
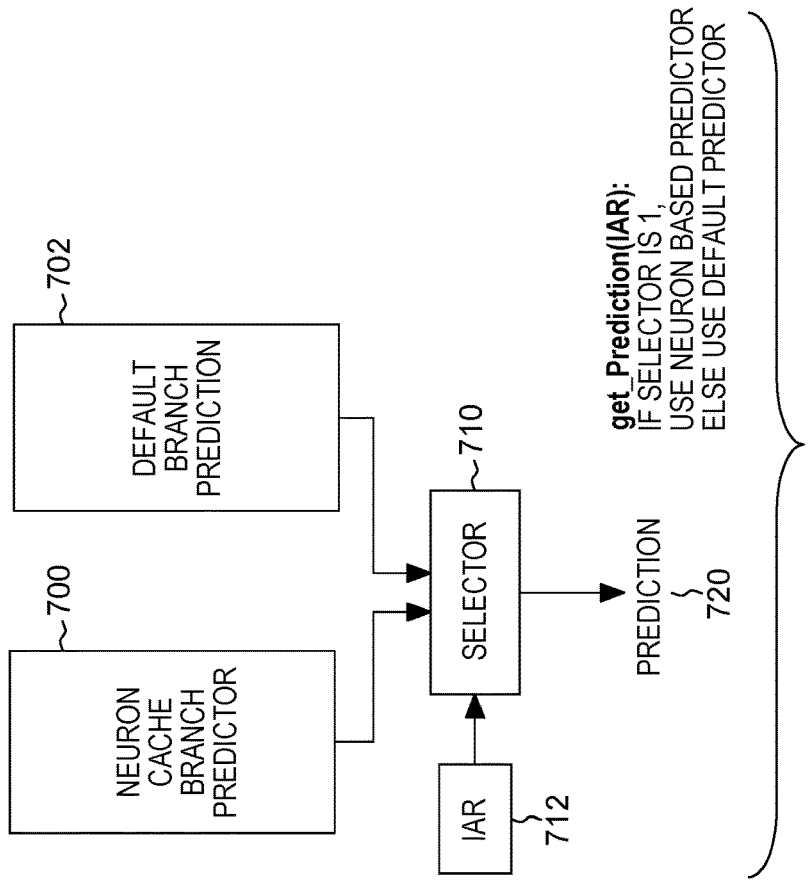
FIG. 8 depicts another example of selecting when to use a hardware neuron cache for prediction, in accordance with one or more aspects of the present invention.

In a further embodiment, a selector makes its determination based on whether it is indicated that the branch for which the address is being predicted is a difficult-to-predict branch. In one example, referring to FIG. 8, an indication of a neuron cache branch predictor 800 and an indication of a default branch predictor 802 are input into a selector 810 (e.g., a hard-to-predict (HTP) selector), and selector 810 selects from a particular instruction address register 812 a predicted target address 820, using either the neuron cache branch predictor or a default branch predictor (e.g., if HTP selector determines branch is difficult-to-predict, use the neuron cache branch predictor; else use the default branch predictor).

As an example, the selector (e.g., selector 710 and/or selector 810) is included in a branch prediction unit/component, such as branch prediction unit 220 and/or branch prediction component 170. Other variations are possible.

Figure 9:
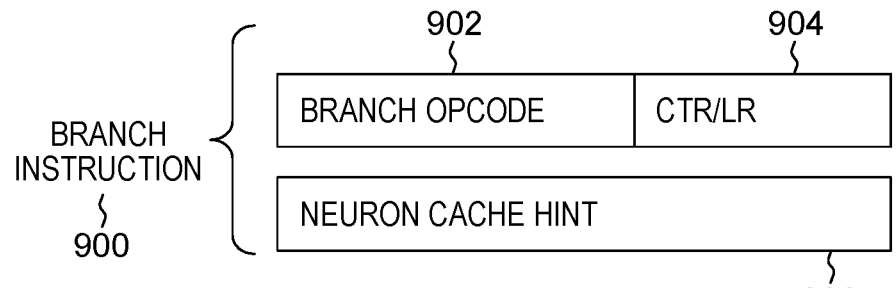
FIG. 9 depicts one example of a format of a branch instruction, in accordance with one or more aspects of the present invention.

In one or more aspects, to determine whether a branch is a selected branch, such as a difficult-to-predict branch, in which a neuron cache is to be used for prediction, a prefix is provided in the corresponding branch instruction that indicates whether the neuron cache is to be used. For instance, as shown in FIG. 9, a branch instruction 900 includes, for instance, an operation code 902, an indication of a count register (CTR) and/or a link register (LR) 904 to provide, e.g., a branch target address and/or return pointers, and a neuron cache indicator 906 (also referred to as a neuron cache hint) that provides an indication that it may be useful to use the neuron cache predictor. As examples, the neuron cache indicator may be included as part of the instruction, either as a prefix or a suffix or may be included as part of a prefix instruction separate from the branch instruction that precedes the branch instruction. Other variations are also possible.

Figure 10:
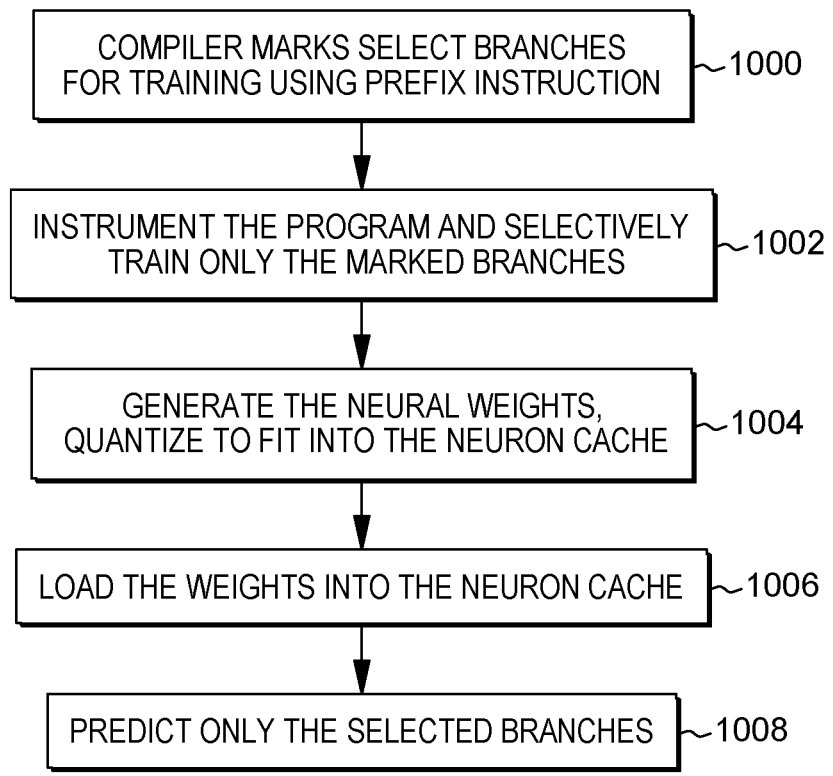
FIG. 10 depicts one example of further details of a training process in which selected code is used in the training, in accordance with one or more aspects of the present invention.

The neuron cache indicator (e.g., the prefix) may be used in training. For instance, as described with reference to FIG. 10, a compiler marks select branches (e.g., difficult-to predict branches) for training using a prefix indicator 1000. Based thereon, the training is only performed for the section of code that includes the marked branches 1002 (i.e., the instructions associated therewith); the other sections of code are not learned or used in training. Based on the training, neural weights are determined and quantized to fit into the neuron cache 1004. The weights are loaded into the neuron cache 1006 and the neuron cache is used to predict the selected branches 1008.

In further detail, in one example, a compiler maintains a global branch history vector and tracks taken address patterns of selected branches. The compiler obtains/determines, as examples, a global history vector pattern, taken address patterns and branch targets for a branch of interest. The compiler uses a recurrent neural network technique, an example of which is further described herein, and trains on, e.g., the above data to generate a weight matrix and an instruction address register buffer. The compiler statically stores the weight cache information and instruction address register buffer as part of the program and loads the same to the hardware, in accordance with one or more aspects of the present invention. In one example, the compiler stores the weight cache information and instruction address register buffer as a separate binary file which then can be optionally loaded to the hardware from the operating system using, e.g., a command and/or an instruction. Other variations are possible.

Figure 11:
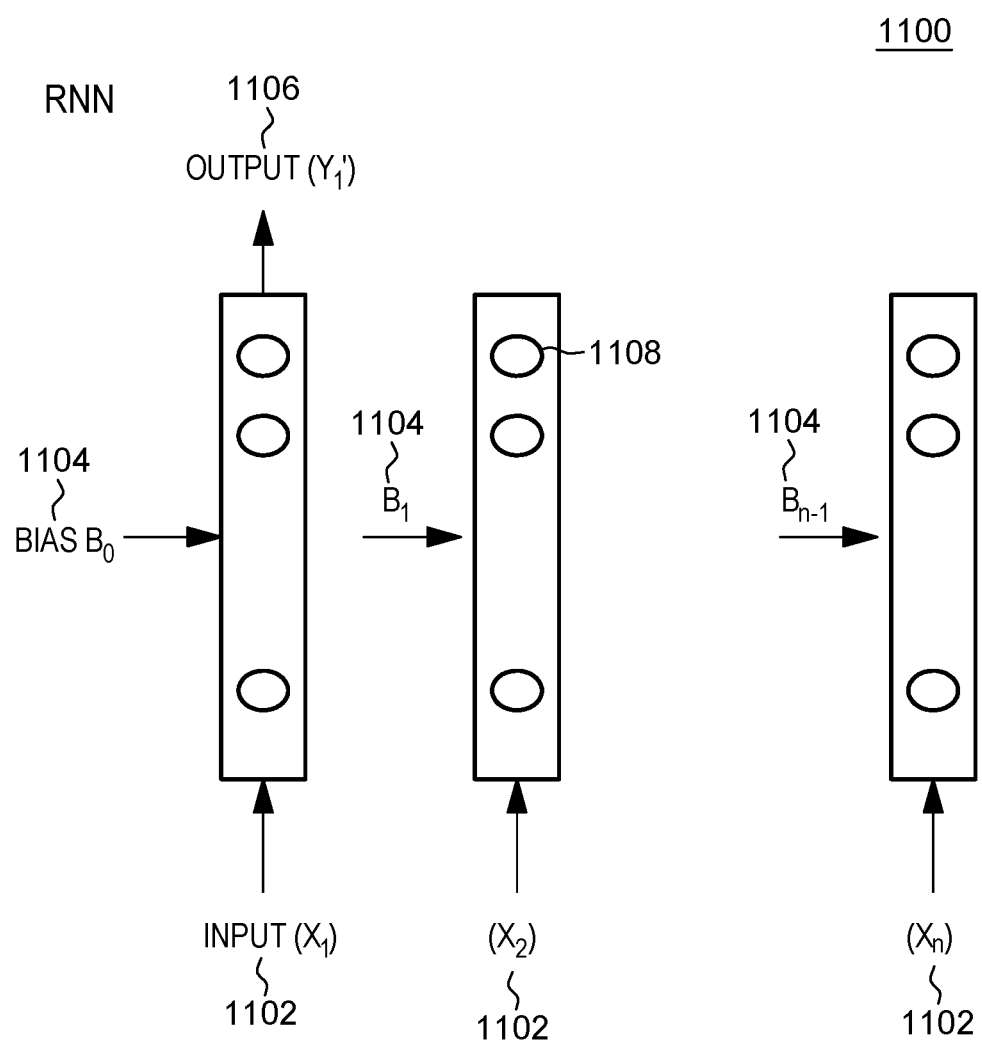
FIG. 11 depicts one example of a recurring neural network technique, in accordance with one or more aspects of the present invention.

As indicated above, in one example, the training uses a recurrent neural network that is used to make a prediction based on certain characteristics, such as sequential patterns. As shown in FIG. 11, in one example, a recurrent neural network technique 1100 has one or more inputs 1102, which along with, at least, one or more biases 1104, produce one or more outputs 1106. For example, for an instruction address register buffer of size 128 (e.g., 128 unique instruction addresses) and a hidden neuron layer of 4, a recurrent neural network technique includes weights 1108=[128, 6]; bias=[128, 1].

In further detail, in one example, the parameters to a recurrent neural network include: an input 1102, which, for instance, is an instruction address register buffer that includes an instruction address register sequence; a hidden state in which h(t) represents a hidden state at time t and acts as memory of the network. h(t) is calculated based on the current input and the previous step's hidden state: $h(t)=g(W_1 \times(t)+W_3 \ h(t-1))$. The function g is taken to be a non-linear transformation such as tan h, a rectified linear unit activation, etc.; weights, in which the recurrent neural network has a weight matrix W and a bias b. W is, e.g., a sum of three weights including input to hidden connections parameterized by a weight matrix w1, hidden-to-hidden recurrent connections parameterized by a weight matrix w2, and a hidden-to-output connection parameterized by a weight matrix w3; and an output, in which output(t) illustrates the output of the network. A vector consists of, e.g., a probability value of the instruction address register buffer. For a single output, the output is passed through a select function, such as a SoftMax function.

To perform training using the recurrent neural network, the following is performed, in one example: initialize weight and bias matrix with zeros; forward propagation to compute predictions (training); for all hidden layers: compute weights of hidden layers using the following equation, as an example: $Hidden_t=g(w_1*input_t+w_3*hidden_{t-1})$ where g(z) is an activation function. In one example, the rectified linear unit (Relu) activation function is used. Relu g(z)=max(0,z); compute the output: $output_t=w_2*hidden_t+b_t$; compute the loss; back-propagation to compute gradients; update weights based on gradients; and repeat from the forward propagation to the back propagation one or more times.

In one example, the neural logic used to make the prediction uses the given weights of the neuron cache, associated bias(es) and the instruction address register and calculates, for instance: $hidden_t=g(w_1*input_t+w_3*hidden_{t-1})$ where g(z)=max(0,z), and $output_t=w_2*hidden_t+b_t$ This output vector has, e.g., probability values of the entries of the instruction address register buffer.

In one or more aspects, prediction based on the recurrent neural network model is a probability of a taken percentage for all (or a subset) of the branches in an instruction address register buffer. For example, considering there are, e.g., 100 branches in an instruction address register buffer, for a given branch A, the model predicts, as examples, a 60% probability of jumping to B from A and a 30% probability of jumping to C from A, and <1% for all others. A single path execution processor can consider one address with the highest probability. However, a multi-path execution processor can consider multiple (e.g., 2 to 3) branches with high probability and proceed to the instruction fetch. Other probabilities and/or variations are possible.

As described herein, in one or more aspects, a technique is provided for hardware-based indirect branch prediction using deep neural network principles. A hardware structure, referred to as a neuron cache, holds the weights of the model. Using the neuron cache and neuron prediction logic, the hardware can predict the next target address for the selected instruction address register. The model can be trained for any target application or can be loaded into the neuron cache during the runtime and used for prediction.

In one or more aspects, the neuron cache and neuron logic are adapted to fit within the hardware. For instance, the number of weights that may fit in the neuron cache depends on the hardware.

Further, in one or more aspects, selective training is performed of certain instruction address registers, and prefix instructions (or other indications) are used to hint to the hardware which branch prediction structure (e.g., neuron cache, default structure) is to be used for the prediction. In one or more aspects, selector techniques are used to ensure that the neuron cache-based branch predictor is used for selected types of branches, e.g., difficult-to-predict branches.

In one example, the branch instructions that may be marked and/or otherwise included in neuron cache prediction are part of a section of code or part of an application registered with the operating system as taking part in such prediction. This registration may be performed using an instruction, command or other mechanism. If such a registration is used, then only that code or application may employ a hardware neuron cache in branch address prediction. Further, if a selector or prefix, etc. is also used, then only those instructions that are selected may employ the hardware neuron cache. Other variations are possible.

In one or more aspects, the hardware branch predictor (e.g., neuron cache) is an application-centric concept, rather than a universal branch predictor. This hardware facility may be used by one or more critical applications and runs in the hardware to generate efficient branch prediction for, e.g., hard-to-predict branches. A participating application registers, in one example, with the operating system to take control of the hardware.

As an example, the training occurs offline using, e.g., static instrumentation or dynamic instrumentation principles. Once trained, the trained weights along with the instruction address register buffer, is loaded when the program is loaded to the central processing unit for execution.

In one or more aspects, various parameters may be used in the prediction, including but not limited to, a global history vector and/or previous target addresses/tags for one or more instruction address registers; however, additional, fewer and/or other parameters may be used in the prediction.

One or more aspects of the present invention are inextricably tied to computer technology and facilitate processing within a computer, improving performance thereof. A neuron cache-based branch prediction technique is used to efficiently handle selected (e.g., difficult-to-predict) branches, improving performance. In one or more aspects, neural branch prediction is provided for indirect branches and multiple predictions may be made for a single instruction address register to enable multipath stream execution. Selective training and prediction are provided, in one or more aspects, for compiler marked branches and/or registered applications, focusing the training, saving time and increasing performance. Selective branches may be trained based on path history information used to generate the neuron weight cache and instruction address register buffer. In one or more aspects, software-based training is provided using dynamic and/or static instrumentation to generate a trained model and cache, in which the cache is loaded into hardware for branch prediction.

In one or more aspects, a neuron cache model is provided to handle selective/difficult-to-predict branches to predict target addresses using deep learning techniques. Selective branches are trained based on path history information to generate the neuron weight cache and instruction address register buffer. Multiple predictions are provided for a single instruction address register with confidence values. Hint and prefix-instruction based approaches are used for marking the branches which can utilize the neuron cache for branch prediction.

Other variations and embodiments are possible.

Figure 12A:
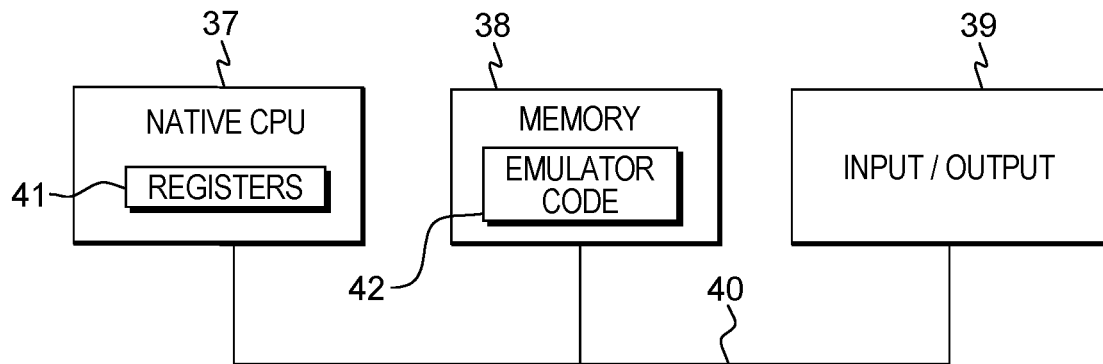
FIG. 12A depicts another example of a computing environment to incorporate and use one or more aspects of the present invention.

Aspects of the present invention may be used with many types of computing environments. Another embodiment of a computing environment to incorporate and use one or more aspects of the present invention is described with reference to FIG. 12A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a processor based on the Power® instruction set architecture offered by International Business Machines Corporation, Armonk, New York; an HP Superdome with Intel® Itanium® II processors offered by Hewlett Packard Co., Palo Alto, California; and/or other machines based on architectures offered by International Business Machines Corporation, Hewlett Packard, Intel Corporation, Oracle, and/or others. Itanium is a trademark or registered trademark of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture instruction set architecture, such as Power processors, HP Superdome servers or others, to emulate the z/Architecture instruction set architecture and to execute software and instructions developed based on the z/Architecture instruction set architecture.

Figure 12B:
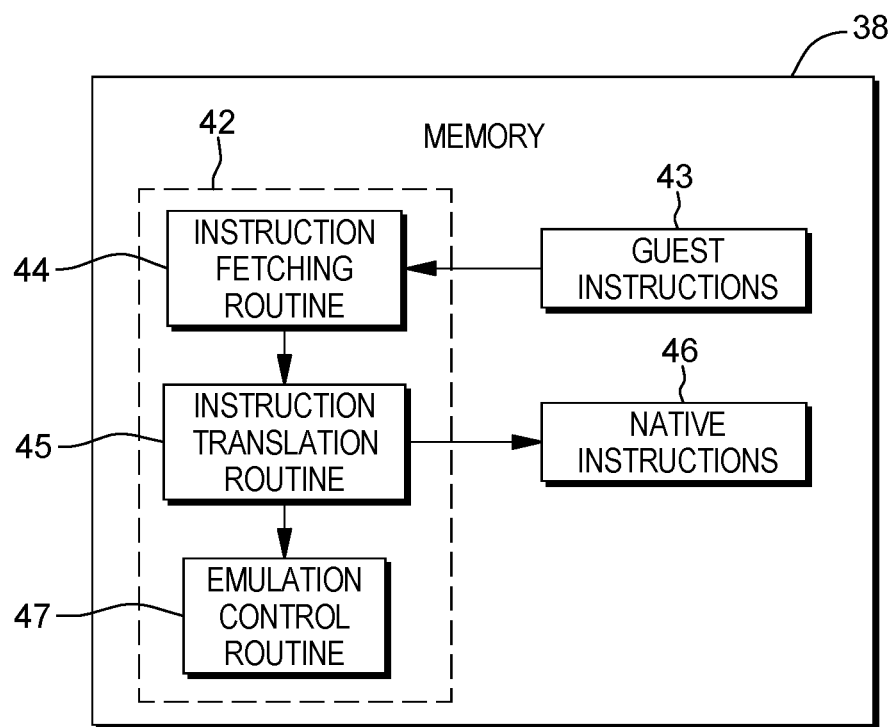
FIG. 12B depicts further details of the memory of FIG. 12A, in accordance with one or more aspects of the present invention.

Further details relating to emulator code 42 are described with reference to FIG. 12B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture instruction set architecture, but instead, are being emulated on native CPU 37, which may be, for example, an Intel Itanium II processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

Branch instructions and/or one or more aspects of the present invention may be emulated, in accordance with one or more aspects of the present invention.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
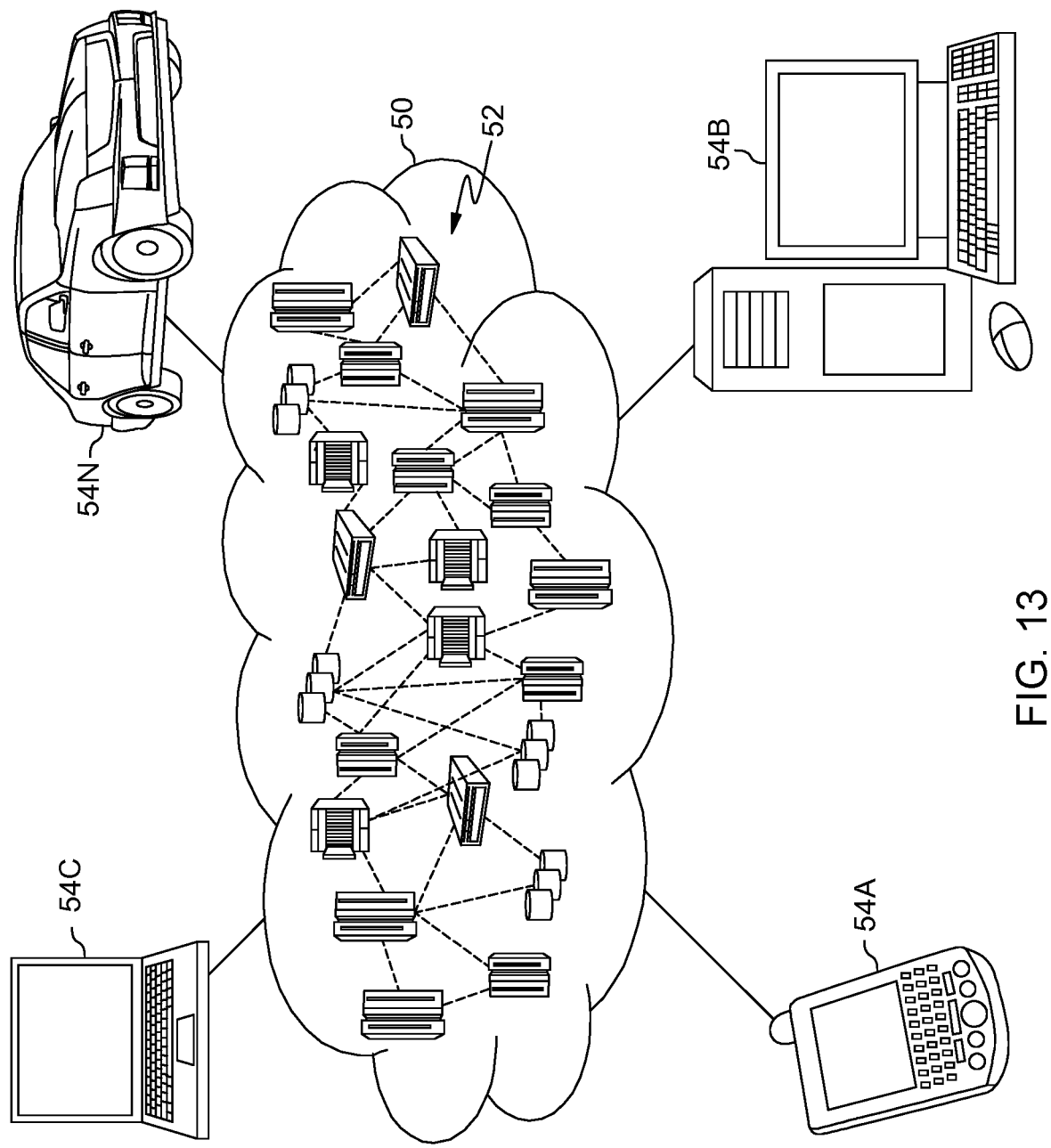
FIG. 13 depicts one embodiment of a cloud computing environment, in accordance with one or more aspects of the present invention.

Referring now to FIG. 13, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 52 and cloud computing environment 50 can communicate with any type of computerized device over any type of network and/or network addressable connection (e.g., using a web browser).

Figure 14:
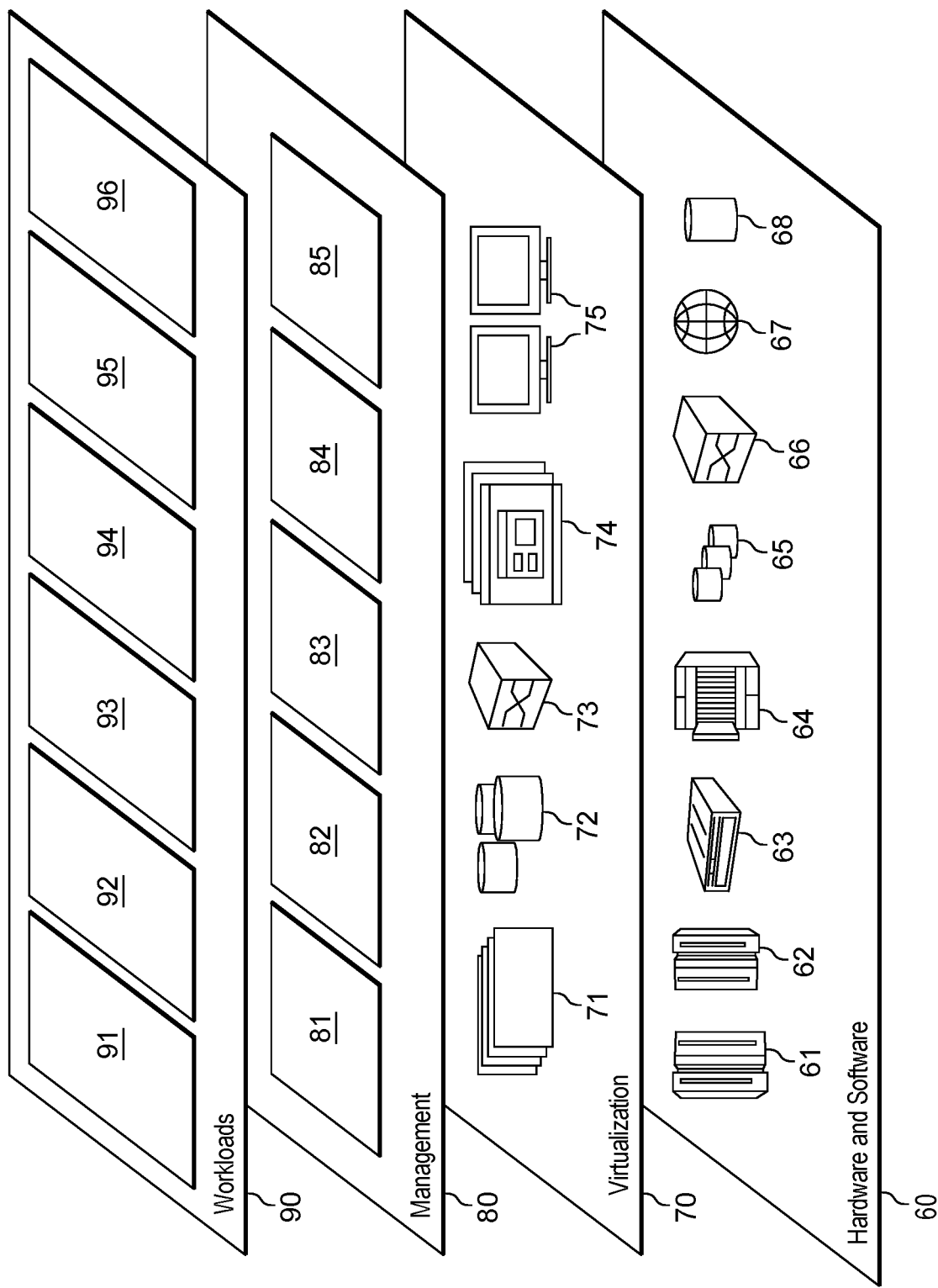
FIG. 14 depicts one example of abstraction model layers, in accordance with one or more aspects of the present invention.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and branch prediction processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions or operations may be used. Further, different neural networks and/or training methodologies may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A branch prediction system comprising:
   a neuron cache branch predictor including:
      a neuron cache, the neuron cache including one or more weights of a neural network model trained for one or more selected code sections; and
      logic coupled to the neuron cache to be used with the neuron cache to predict a target address for a branch instruction of the one or more selected code sections, wherein the neuron cache branch predictor is exclusively used by one or more applications selectively hosen to participate in neuron cache prediction and registered, using a registration mechanism, with a control program to use the neuron cache branch predictor, the one or more applications including the one or more selected code sections.

2. The branch prediction system of claim 1, wherein the one or more selected code sections are one or more sections of the one or more applications determined to include at least one selected type of branch.

3. The branch prediction system of claim 2, wherein the at least one selected type of branch includes branches that are difficult to predict.

4. The branch prediction system of claim 1, further comprising:
   a default predictor usable in branch address prediction; and
   a selector to select between the default predictor and the neuron cache branch predictor to be used in predicting the target address for the branch instruction.

5. The branch prediction system of claim 4, wherein the selector is configured to select the neuron cache branch predictor based on the branch instruction being determined to be associated with a selected type of branch.

6. The branch prediction system of claim 5, wherein the branch instruction includes an indication that it is associated with the selected type of branch.

7. The branch prediction system of claim 6, wherein the indication is a prefix included as part of the branch instruction.

8. The branch prediction system of claim 6, wherein the indication is a prefix included in a prefix instruction executed prior to the branch instruction.

9. The branch prediction system of claim 4, wherein the selector is configured to select the default predictor based on a particular branch instruction being determined to be associated with other than a selected type of branch.

10. The branch prediction system of claim 1, wherein other applications not registered with the control program to use the neuron cache branch predictor are excluded from using the neuron cache branch predictor.

11. The branch prediction system of claim 1, wherein the logic is configured to determine a plurality of target addresses and associated confidence values for the plurality of target addresses and to select from the plurality of target addresses, based on the associated confidence values for the plurality of target addresses, the target address predicted for the branch instruction.

12. A branch prediction method comprising:
   obtaining a branch instruction for which a target address is to be predicted; and
   using a neuron cache branch predictor, including a neuron cache and logic coupled to the neuron cache, to predict the target address for the branch instruction, the neuron cache including one or more weights of a neural network model trained for one or more selected code sections, the one or more selected code sections including the branch instruction, and wherein the neuron cache branch predictor is exclusively used by one or more applications selectively chosen to participate in neuron cache prediction and registered, using a registration mechanism, with a control program to use the neuron cache branch predictor, the one or more applications including the one or more selected code sections.

13. The branch prediction method of claim 12, further comprising selecting between the neuron cache branch predictor and a default predictor usable in branch address prediction to predict the target address for the branch instruction, wherein the selecting selects the neuron cache branch predictor based on the branch instruction being determined to be associated with a selected type of branch.

14. The branch prediction method of claim 13, wherein the branch instruction includes an indication that it is associated with the selected type of branch.

15. The branch prediction method of claim 14, wherein the indication is a prefix included as part of the branch instruction.

16. The branch prediction method of claim 14, wherein the indication is a prefix included in a prefix instruction executed prior to the branch instruction.

17. The branch prediction method of claim 13, wherein the selected type of branch is a difficult to predict branch.

18. The branch prediction method of claim 12, wherein the using further comprises:
   using, at least, the neuron cache and the logic in determining a plurality of target addresses for the branch instruction and associated confidence values for the plurality of target addresses; and
   selecting from the plurality of target addresses, based on the associated confidence values for the plurality of target addresses, the target address predicted for the branch instruction.

19. The branch prediction method of claim 12, wherein the one or more selected code sections are one or more sections of the one or more applications determined to include at least one selected type of branch.

20. A computer program product for facilitating processing within a computing environment, the computer program product comprising:
   one or more computer readable storage media and program instructions collectively stored on the one or more computer readable storage media to perform a method comprising:
   obtaining a branch instruction for which a target address is to be predicted; and
   using a neuron cache branch predictor, including a neuron cache and logic coupled to the neuron cache, to predict the target address for the branch instruction, the neuron cache including one or more weights of a neural network model trained for one or more selected code sections, the one or more selected code sections including the branch instruction, and wherein the neuron cache branch predictor is exclusively used by one or more applications selectively chosen to participate in neuron cache predition and registered, using a registration mechanism, with a control program to use the neuron cache branch predictor, the one or more applications including the one or more selected code sections.

\* \* \* \* \*